Patented Sept. 15, 1925.

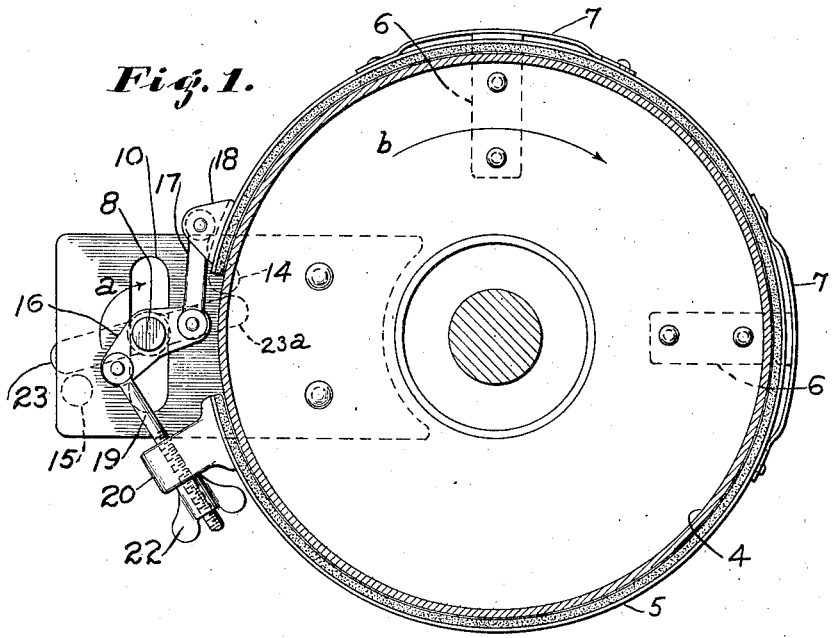
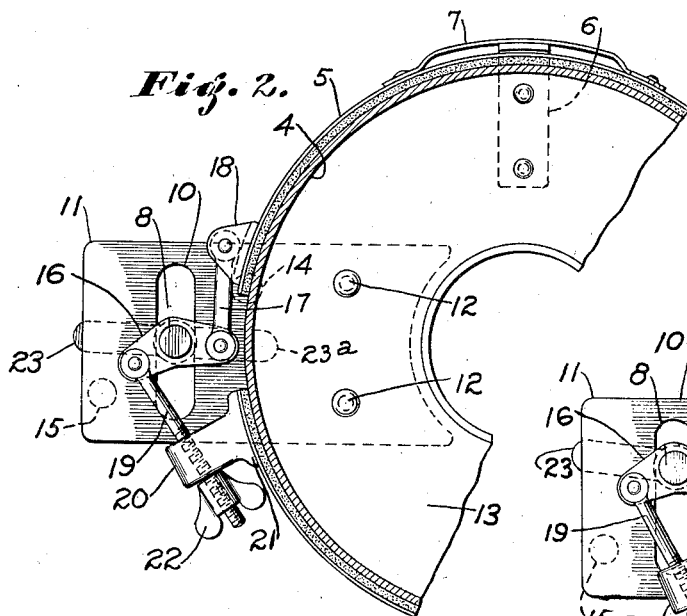
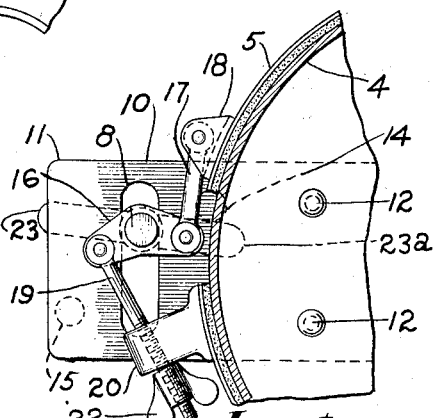

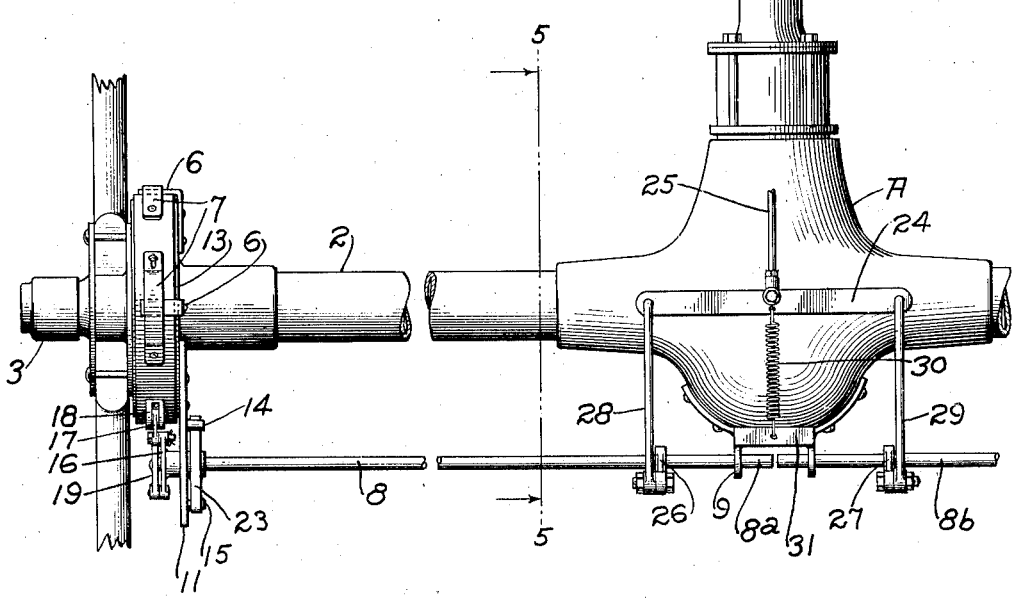
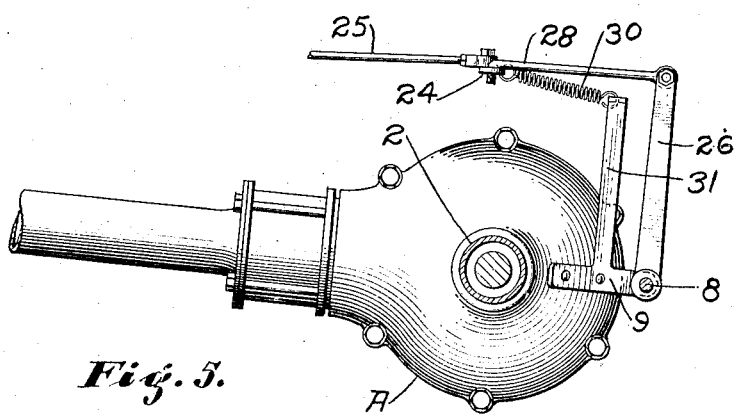

1,554,112

UNITED STATES PATENT OFFICE.

HERMAN A. MENNE, OF SAN FRANCISCO, CALIFORNIA.

BRAKE-ACTUATING MECHANISM.

Application filed August 4, 1924. Serial No. 730,095.

*To all whom it may concern:*

Be it known that I, HERMAN A. MENNE, a citizen of the United States, residing at the city and county of San Francisco and State of California, have invented new and useful Improvements in Brake-Actuating Mechanism, of which the following is a specification.

This invention relates to vehicle brakes, and especially to a brake actuating mechanism.

The object of the present invention is to generally improve and simplify the construction and operation of brake actuating mechanisms such as are employed in conjunction with brakes using a brake drum, together with an external or internal expanding brake band, and particularly to provide a brake actuating mechanism which utilizes the gripping action between the brake band and the drum to increase the braking action.

One form which my invention may assume is exemplified in the following description and illustrated in the accompanying drawings, in which—

Fig. 1 is a side elevation of a standard form of brake drum employing an external contracting form of brake band, said view also disclosing the brake band actuating mechanism forming the subject matter of the present application.

Fig. 2 is a partial side elevation of the same mechanism illustrated in Fig. 1, said view showing the brake band in gripping position.

Fig. 3 is also a side elevation of the drum and band, the major portion thereof being broken away, said view particularly illustrating the position of the brake band actuating mechanism when fully applied.

Fig. 4 is a plan view of the rear axle housing of an automobile, showing the position of the brake drum and the band, and the actuating mechanism therefor.

Fig. 5 is a side elevation in section taken on line 5—5 of Fig. 4.

Referring to the drawings in detail, and particularly to Figs. 1 and 4, A indicates the differential housing on an automobile, 2 the axle housing, 3 the hub of a standard form of wheel, 4 the brake drum secured thereto, and 5 an external brake band surrounding the same. The band is of the split type, as shown, and is supported with relation to the drum by means of brackets 6 and spring leaf retainers 7, this feature being of no particular importance as it is more or less employed in standard practice. The spring leaves 7 are, however, a little longer than usual to permit partial rotation of the brake band with the drum, as will hereinafter be described.

The brake actuating mechanism forming the subject matter of the present invention consists of a shaft 8, one end of the shaft being journalled in a bearing bracket 9, as shown in Figs. 4 and 5, and the other end extending through a slot 10 formed in a bracket 11. This bracket is riveted or otherwise secured, as indicated at 12, to the inner stationary plate 13 of the brake drum housing, and it serves two functions, first, that of permitting vertical movement of the shaft 8 in the slot 10 and, secondly, that of supporting a pair of lugs generally indicated at 14 and 15.

The outer end of the shaft which projects through the slotted bracket 11 is provided with an arm 16, which is keyed or otherwise secured thereto. One end of the arm is connected by means of a link 17 with one end of the brake band, as indicated at 18, while the opposite end of the arm 16 is connected through a link 19 with a lug 20, which is secured to the opposite end of the brake band as indicated at 21. The outer end of the link 19 is threaded to receive a nut 22 and this nut is employed for the purpose of taking up wear between the brake band and the drum in the usual manner. Also secured on the shaft 8, on the inner side of the bracket 11, is an arm 23. This arm is clearly shown in full lines in Fig. 4 and in dotted lines in Figs. 1, 2 and 3. One end of the arm 23 is adapted to engage the lug 14, while the opposite end is adapted to engage the lug 15. The object of permitting such an engagement will be more fully described.

It will be noted by referring to Fig. 4 that only one wheel, together with brake drum band and actuating mechanism, is shown. It should, however, be understood that the mechanism is duplicated on each side and that both brakes are actuated by an equalizing bar 24 through means of a rod 25 and foot pedal or the like not shown. It will also be noted that the shaft 8 is cut off at the point indicated at 8ª. In other words there are two shafts, one indicated at 8 and one indicated at 8ᵇ. The shaft 8 actuates the brake mechanism on the left-hand side, while the shaft 8ᵇ actuates the brake mechanism on the right-hand side, which is not illustrated.

The inner ends of the shafts 8 and 8ᵇ are provided with crank arms 26 and 27. These crank arms are connected through links 28 and 29 with the equalizing bar 24, and the shafts 8 and 8ᵇ may thus be turned in unison or independently of each other as the case may be. The actual operation of the braking mechanism will be as follows:

When it is desired to apply the brakes, it is merely necessary to exert a pull on the rod 25 and the equalizing bar 24 through means of a foot pedal or other actuating mechanism not here disclosed. A pull thus imparted will impart a rotary movement to the shafts 8 and 8ᵇ through means of the links 28 and 29 and the crank arms 26 and 27. For the purpose of simplifying the description, the turning movement of shaft 8 alone will be described, and particular reference will be made to Figs. 1, 2 and 3.

The shaft 8, together with the arms 16 and 23 secured thereto, normally assumes the position shown in Fig. 1, but when shaft 8 is rotated in the direction of arrow a (see Fig. 1), a downward pull is exerted on the link 17 and an upward pull on the link or rod 19. This tightens the band about the drum 4 and a braking action is thus immediately produced.

It will further be supposed that the brake drum is rotating in the direction of arrow b (see Fig. 1). If this is the case, it will be seen that the brake band will have a tendency to rotate with the drum in the same direction. Such rotating movement of the band with the drum is permitted to a limited extent. This will be understood when reference is made to Fig. 2, Fig. 2 showing the positions of the arms 16 and 23 when the brake band has been applied. The moment the band tends to rotate with the drum, the outer end of the shaft 8 will move upwardly in the slot 10 and the inner end of the arm 23, indicated at 23ᵃ, will thus move upwardly into contact with the lug 14. This lug limits the rotating movement of the band with the drum and thereby stops further rotating movement. The band will, nevertheless, continue to exert an upward pull on the link 17 and this pull will further tend to lift the shaft 8 upwardly in the slot 10. The arm 23 will, in other words, function as a lever with the lug 14 as a fulcrum point, and as this lever is pulled upwardly a pull will be exerted on the rod 19 and the lug 20, which is attached to the free end 21 of the brake band. This pull tends to further tighten the gripping action between the band and the drum and the braking action between the two is increased. The engagement of the inner end 23ᵃ of the arm 23 with lug 14 is illustrated in Fig. 3, this view also showing the upward movement of the shaft 8 in the slot 10. In other words, the gripping action produced between the brake band and the drum is utilized to further increase the gripping action, and the operator or driver of the car is thus relieved to a considerable extent when applying the brake, as he will not have to depress the foot pedal or pull on the brake handle to such a great extent as is usually the case, this being due to the fact that the brake more or less automatically applies itself once a contact is made between the brake band and the drum.

The reason for employing two lugs is to take care of reverse movement; for instance, when backing up. The mechanism acts the same whether the brake drum is rotating in one direction or another, and it is for this reason that a double arm 23 is employed and similarly two lugs 14 and 15.

The retaining spring leaves 7 are elongated, as shown in Figs. 1 and 2, for the purpose of permitting a limited rotating movement of the band with the drum, and they otherwise serve the usual function, to-wit, that of maintaining a clearance between the brake band and the drum when the brake band is released.

To permit vertical movement of the outer end of the shaft 8 in the slot 10 of bracket 11, a comparatively narrow bearing bracket is employed, as indicated at 9; that is, the inner end of the shaft 8 loosely fits this bearing bracket and as the bearing is narrow, it permits sufficient vertical movement of the outer end of the shaft to permit the braking mechanism to be actuated as described. In other words, the narrow bearing member 9 eliminates the necessity of employing universal joints and the like. The brake actuating mechanism is otherwise released after application by releasing the foot pedal or other actuating mechanism, and it is further returned to normal position by a spring such as indicated at 30, this spring being connected to a stationary bracket 31 at one end and to the equalizing bar 24 at the opposite end.

While certain features of the present invention are more or less specifically illustrated, I wish it understood that various changes in form and proportion may be resorted to within the scope of the appended claims. I similarly wish it understood that the materials and finish of the several parts employed may be such as the experience and judgment of the manufacturer may dictate or various uses may demand.

Having thus described my invention, what I claim and desire to secure by Letters Patent is—

1. The combination with a rotatable brake drum and a brake band cooperating therewith, of means permitting a limited rotary movement of the band with the drum, a rocking floating member for imparting movement to the band to grip the drum, and means actuated by rotary movement of the band with the drum to transmit a further rocking movement to the floating member and thereby increase the gripping action of the band.

2. The combination with an axle, a brake drum and a split brake band cooperating therewith, of a second axle disposed in substantial parallelism with the first-named axle, an arm secured on said axle, links connecting the opposite ends of said arm with the opposite ends of the split brake band, means for imparting rotary movement to the second-named axle to apply the brake band, means permitting partial rotation of the brake band with the drum when the brake band is applied, means permitting movement of the second-named axle in unison with the brake band, and means for transmitting the rotary movement of the brake band with the drum to the second-named axle to further increase the gripping action between the band and the drum.

3. The combination with the axle housing of an automobile, the brake drum and a split brake band cooperating therewith, of a stationary bracket plate secured adjacent the drum, said bracket plate having a slot formed therein, an axle disposed in substantial parallelism with the axle housing, one end of said axle extending through the slotted bracket plate and having a floating movement in the slot, an arm secured on the axle, links connecting the opposite ends of said arm with the opposite ends of the split brake band, means for imparting a rotary movement to the axle to apply the brake band, means permitting a limited rotary movement of the band with the drum when the band is applied, and means for transmitting said rotary movement of the band with the drum through the secondary axle to further tighten the gripping action between the band and the drum.

4. The combination with the axle housing of an automobile, the brake drum and a split brake band cooperating therewith, of a stationary bracket plate secured adjacent the drum, said bracket plate having a slot formed therein, an axle disposed in substantial parallelism with the axle housing, one end of said axle extending through the slotted bracket plate and having a floating movement in the slot, an arm secured on the axle, links connecting the opposite ends of said arm with the opposite ends of the split brake band, means for imparting a rotary movement to the axle to apply the brake band, a second lever secured on the axle, and lugs on the bracket plate with which the opposite ends of the second-named arm are engageable.

HERMAN A. MENNE.